(12) United States Patent
Inada

(10) Patent No.: US 9,465,225 B2
(45) Date of Patent: Oct. 11, 2016

(54) 3D DISPLAY DEVICE

(71) Applicants:INNOCOM TECHNOLOGY(SHENZHEN) CO., LTD., Longhua Town, Bao An District, Shenzhen, Guangdong Province (CN); InnoLux Corporation, Miao-Li County (TW)

(72) Inventor: Toshiya Inada, Miao-Li County (TW)

(73) Assignees: INNOCOM TECHNOLOGY(SHENZHEN) CO., LTD., Longhua Town, Guangdong Province (CN); INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/791,761

(22) Filed: Jul. 6, 2015

(65) Prior Publication Data

US 2015/0309320 A1    Oct. 29, 2015

Related U.S. Application Data

(62) Division of application No. 13/488,182, filed on Jun. 4, 2012, now Pat. No. 9,110,299.

(51) Int. Cl.
| | | |
|---|---|---|
| *G02F 1/1335* | (2006.01) | |
| *G02B 27/22* | (2006.01) | |
| *G02F 1/1337* | (2006.01) | |
| *G02F 1/1343* | (2006.01) | |
| *G02F 1/167* | (2006.01) | |

(52) U.S. Cl.
CPC ......... *G02B 27/2214* (2013.01); *G02B 27/225* (2013.01); *G02F 1/134309* (2013.01); *G02F 1/133753* (2013.01); *G02F 1/134363* (2013.01); *G02F 2001/1676* (2013.01)

(58) Field of Classification Search
CPC .......... G02B 27/225; G02B 277/2214; G02F 1/133753; G02F 1/1335
USPC .......................................... 349/15
See application file for complete search history.

(56) References Cited

U.S. PATENT DOCUMENTS

| | | |
|---|---|---|
| 7,646,451 B2 | 1/2010 | Vogel et al. |
| 2001/0001566 A1 | 5/2001 | Moseley et al. |

(Continued)

FOREIGN PATENT DOCUMENTS

| | | |
|---|---|---|
| CN | 102162958 | 8/2011 |
| TW | 201129828 | 9/2011 |

OTHER PUBLICATIONS

Chinese language office action dated Jun. 1, 2015, issued in application No. CN 201310195865.3.

*Primary Examiner* — Lucy Chien
(74) *Attorney, Agent, or Firm* — McClure, Qualey & Rodack, LLP

(57) ABSTRACT

In an embodiment of the invention, a 3D display device is provided. The 3D display device includes: a first substrate including a plurality of right eye pixels and left eye pixels in an alternate arrangement; a second substrate opposite to the first substrate; a first optical modulating unit with a first inclined direction located in the right eye pixels between the first substrate and the second substrate; a second optical modulating unit with a second inclined direction located in the left eye pixels between the first substrate and the second substrate, wherein the first inclined direction is distinct from the second inclined direction; and a light transparent element disposed on the second substrate.

6 Claims, 5 Drawing Sheets

(56) References Cited

U.S. PATENT DOCUMENTS

2007/0177086 A1\* 8/2007 Ishitani ............ G02F 1/133528
349/117
2008/0266471 A1 10/2008 Hisatake
2011/0205342 A1 8/2011 Lin et al.
2012/0299808 A1 11/2012 Lee et al.
2012/0300141 A1\* 11/2012 Shin .................. G02B 27/2214
349/15

\* cited by examiner

3D DISPLAY DEVICE

CROSS REFERENCE TO RELATED APPLICATIONS

This application is a Divisional of pending U.S. patent application Ser. No. 13/488,182, filed on Jun. 4, 2012, and entitled "3D display devices", the entirety of which is incorporated by reference herein.

BACKGROUND OF THE INVENTION

1. Field of the Invention

The invention relates to a 3D display device, and in particular to a 3D display device capable of improving brightness.

2. Description of the Related Art

Liquid crystal display devices are used for many kinds of electronic devices such as a mobile telephone, a television receiver, or the like, and much research has been done for further improving the quality.

While the advantages of a liquid crystal display device are its small size, light weight, and low power consumption compared to a CRT (cathode-ray tube). For the liquid crystal display device, one problem is narrow viewing angle, especially in vertical alignment mode. In-plane switching mode liquid crystal alignment has better viewing angle performance. In recent years, much research has been done on multi domain methods. That is, an alignment division method to improve viewing angle characteristics. For example, an MVA (multi-domain vertical alignment) or PVA (patterned vertical alignment) mode pixel has multiple VA (vertical alignment) liquid crystal area in symmetric arrangement.

The multi-domain, however, causes devices to have a small aperture ratio due to the boundary area between domains. Generally, the domain boundary is located at the center of pixels. The domain boundary is dark, which causes low light transmittance.

Thus, improving the brightness of LCDs is desirable, especially for 3D application.

BRIEF SUMMARY OF THE INVENTION

One embodiment of the invention provides a 3D display device, comprising: a first substrate comprising a plurality of right eye pixels and left eye pixels in an alternate arrangement; a second substrate opposite to the first substrate; a first optical modulating unit with a first inclined direction located in the right eye pixels between the first substrate and the second substrate; a second optical modulating unit with a second inclined direction located in the left eye pixels between the first substrate and the second substrate, wherein the first inclined direction is distinct from the second inclined direction; and a light transparent element disposed between the second substrate and an observer. The light transparent element comprises a lens or a barrier with an aperture.

In an embodiment, the first optical modulating unit and the second optical modulating unit are liquid crystal molecules having a long axis. In a vertical alignment (VA) mode, the 3D display device further comprises a common electrode comprising a plurality of holes formed on the second substrate, wherein the hole is located at a boundary between the right eye pixel and the left eye pixel. The arrangement of the liquid crystal molecules with the first inclined direction located in the right eye pixel is a mirror image of the arrangement of the liquid crystal molecules with the second inclined direction located in the left eye pixel which is adjacent to the right eye pixel. The liquid crystal molecules are divided into a plurality of domains surrounding the one hole in the right eye pixel and the left eye pixel which is adjacent to the right eye pixel. The domain in the right eye pixel is a mirror image of the domain in the left eye pixel which is adjacent to the right eye pixel. All of the light through the right eye pixel is approximately perpendicular to the long axis of the liquid crystal molecules which is received by right eye of the observer after passing through the light transparent element. All of the light through the left eye pixel is approximately perpendicular to the long axis of the liquid crystal molecules which is received by left eye of the observer after passing through the light transparent element. In another vertical alignment (VA) mode, the 3D display device further comprises a plurality of protrusions formed on a common electrode on the second substrate, wherein the protrusion is located at a boundary between the right eye pixel and the left eye pixel. The arrangement of the liquid crystal molecules with the first inclined direction located in the right eye pixel is a mirror image of the arrangement of the liquid crystal molecules with the second inclined direction located in the left eye pixel which is adjacent to the right eye pixel. The liquid crystal molecules are divided into a plurality of domains surrounding the one protrusion in the right eye pixel and the left eye pixel which is adjacent to the right eye pixel. The number of the domains in the right eye pixel is equal to the number of the domains in the left eye pixel which is adjacent to the right eye pixel. All of the light through the right eye pixel is approximately perpendicular to the long axis of the liquid crystal molecules which is received by right eye of the observer after passing through the light transparent element. All of the light through the left eye pixel is approximately perpendicular to the long axis of the liquid crystal molecules which is received by left eye of the observer after passing through the light transparent element.

In an in-plane switching (IPS) mode, the 3D display device further comprises a first pixel electrode formed in the right eye pixel of the first substrate, wherein the first pixel electrode comprises a plurality of first slits with a first direction. The 3D display device further comprises a second pixel electrode formed in the left eye pixel of the first substrate, wherein the second pixel electrode comprises a plurality of second slits with a second direction, and the first direction is distinct from the second direction.

In an embodiment, the first optical modulating unit and the second optical modulating unit are organic light emitting diodes (OLEDs). The OLED comprises a first electrode, a light emitting layer having a surface formed on the first electrode and a second electrode formed on the light emitting layer. The OLED emits white light. Light perpendicular to the surface of the light emitting layer of the OLED emitted from the right eye pixel is received by right eye of the observer after passing through the light transparent element. Light perpendicular to the surface of the light emitting layer of the OLED emitted from the left eye pixel is received by left eye of the observer after passing through the light transparent element.

In an embodiment, the first optical modulating unit and the second optical modulating unit are reflective particles encapsulated by microcapsules. The reflective particles reflect outside light to form a reflected light. The reflected light emitted from the right eye pixel is received by right eye of the observer after passing through the light transparent element. The reflected light emitted from the left eye pixel is received by left eye of the observer after passing through the light transparent element.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1A:
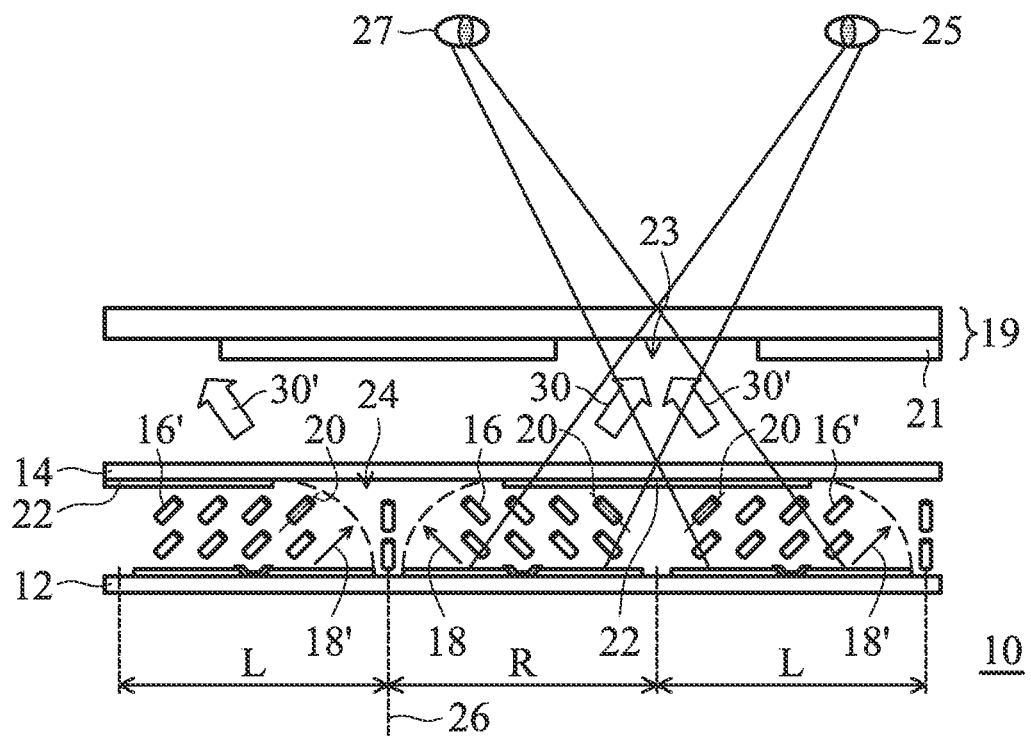
FIG. 1A shows a cross-section view of a 3D display device according to an embodiment of the invention.

According to one embodiment of the invention, referring to FIG. 1A, a 3D display device is provided. A 3D display device 10 comprises a first substrate 12 comprising a plurality of right eye pixels R and left eye pixels L in an alternate arrangement, a second substrate 14 opposite to the first substrate 12, a first optical modulating unit 16 with a first inclined direction 18 located in the right eye pixels R between the first substrate 12 and the second substrate 14, a second optical modulating unit 16' with a second inclined direction 18' located in the left eye pixels L between the first substrate 12 and the second substrate 14, and a light transparent element 19 disposed between the second substrate 14 and an observer. The first inclined direction 18 is distinct from the second inclined direction 18'.

The first substrate 12 may be a thin film transistor (TFT) array substrate. The second substrate 14 may be a color filter (CF) array substrate. In this embodiment, the light transparent element 19 is a fixed type barrier, for example a barrier 21 with a plurality of apertures 23. In other embodiment, switchable barrier cells that can be turned ON/OFF by a voltage apply for LC cells are still available. In other embodiment, for example, a fixed type lenticular lens or switchable lens cells that can be turned ON/OFF by a voltage apply for LC cells are still available.

In this embodiment, the first optical modulating unit 16 and the second optical modulating unit 16' are liquid crystal molecules (16, 16') having a long axis 20. In a vertical alignment (VA) mode, the 3D display device 10 further comprises a common electrode 22, for example ITO, comprising a plurality of holes 24 (e.g., ITO holes) formed on the second substrate 14. Specifically, the hole 24 is located at a boundary 26 between the right eye pixel R and the left eye pixel L.

In FIG. 1A, the liquid crystal molecules 16 incline to, for example, the left such that the arrangement of the liquid crystal molecules 16 with the first inclined direction 18 located in the right eye pixel R is a mirror image of the arrangement of the liquid crystal molecules 16' with the second inclined direction 18' located in the left eye pixel L which is adjacent to the right eye pixel R.

Figure 1B:
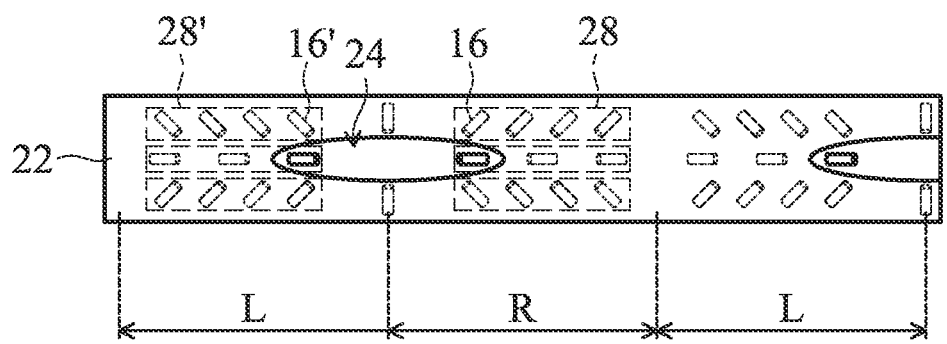
FIG. 1B shows a top view of a common electrode of a 3D display device according to an embodiment of the invention.

Referring to FIG. 1B, a top view of the common electrode 22 of the 3D display device 10, the liquid crystal molecules (16, 16') are divided into a plurality of domains (28, 28') (multi-domain) surrounding the one hole 24 in the right eye pixel R and the left eye pixel L which is adjacent to the right eye pixel R. Specifically, the number of the domains 28 in the right eye pixel R is equal to the number of the domains 28' in the left eye pixel L which is adjacent to the right eye pixel R. Additionally, the domain 28 in the right eye pixel R is a mirror image of the domain 28' in the left eye pixel L which is adjacent to the right eye pixel R.

Still referring to FIG. 1A, specifically, all of the light 30 through the right eye pixel R is approximately perpendicular to the long axis 20 of the liquid crystal molecules 16 which is received by right eye 25 of the observer after passing through the aperture 23 of the barrier 21. Similarly, all of the light 30' through the left eye pixel L is approximately perpendicular to the long axis 20 of the liquid crystal molecules 16' which is received by left eye 27 of the observer after passing through the aperture 23 of the barrier 21. Compared to the conventional vertical alignment (VA) mode in which the ITO hole is opened within the right eye pixel or the left eye pixel such that the liquid crystal molecules are inclined along at least two directions (forming at least one domain boundary) in the right eye pixel or the left eye pixel causing merely a part of the light to travel through the right eye pixel or the left eye pixel approximately perpendicular to the long axis of the liquid crystal molecules to be received by right eye or left eye of an observer (see average brightness), the invention in which the ITO hole is opened at the boundary between the right eye pixel and the left eye pixel such that the liquid crystal molecules are inclined along only one direction (nearly no domain boundary effect) in the right eye pixel or the left eye pixel causing all of the light to travel through the right eye pixel or the left eye pixel approximately perpendicular to the long axis of the liquid crystal molecules to be received by right eye or left eye of an observer (see peak brightness) after passing through the light transparent element, significantly improves brightness.

Figure 2A:
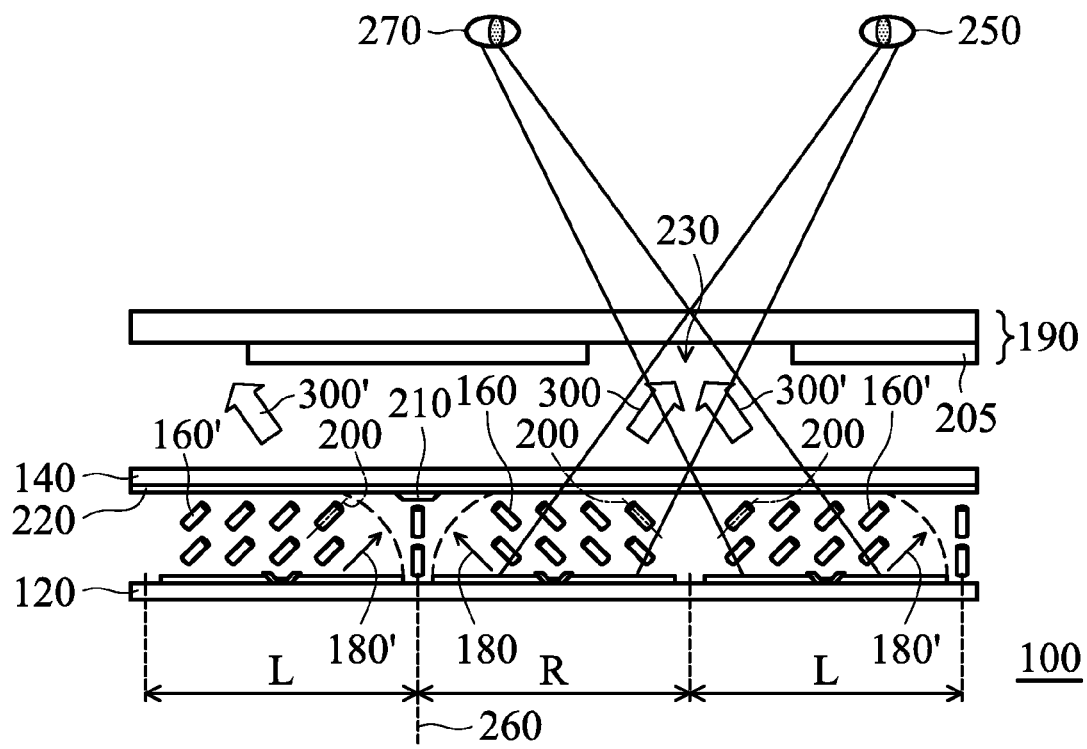
FIG. 2A shows a cross-section view of a 3D display device according to an embodiment of the invention.

According to one embodiment of the invention, referring to FIG. 2A, a 3D display device is provided. A 3D display device 100 comprises a first substrate 120 comprising a plurality of right eye pixels R and left eye pixels L in an alternate arrangement, a second substrate 140 opposite to the first substrate 120, a first optical modulating unit 160 with a first inclined direction 180 located in the right eye pixels R between the first substrate 120 and the second substrate 140, a second optical modulating unit 160' with a second inclined direction 180' located in the left eye pixels L between the first substrate 120 and the second substrate 140, and a light transparent element 190 disposed between the second substrate 140 and an observer. The first inclined direction 180 is distinct from the second inclined direction 180'.

The first substrate 120 may be a thin film transistor (TFT) array substrate. The second substrate 140 may be a color filter (CF) array substrate. In this embodiment, the light transparent element 190 is a fixed type barrier, for example a barrier 205 with a plurality of apertures 230. In other embodiment, switchable barrier cells that can be turned ON/OFF by a voltage apply for LC cells are still available. In other embodiment, for example, a fixed type lenticular lens or switchable lens cells that can be turned ON/OFF by a voltage apply for LC cells are still available.

In this embodiment, the first optical modulating unit 160 and the second optical modulating unit 160' are liquid crystal molecules (160, 160') having a long axis 200. In a vertical alignment (VA) mode, the 3D display device 100 further comprises a plurality of protrusions 210 formed on a common electrode 220, for example ITO, on the second substrate 140. Specifically, the protrusion 210 is located at a boundary 260 between the right eye pixel R and the left eye pixel L.

In FIG. 2A, the liquid crystal molecules 160 incline to, for example, the left such that the arrangement of the liquid crystal molecules 160 with the first inclined direction 180 located in the right eye pixel R is a mirror image of the arrangement of the liquid crystal molecules 160' with the second inclined direction 180' located in the left eye pixel L which is adjacent to the right eye pixel R.

Figure 2B:
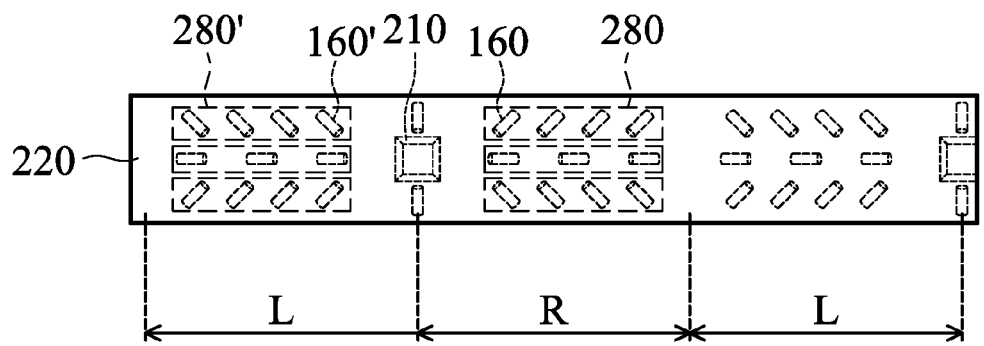
FIG. 2B shows a top view of a common electrode of a 3D display device according to an embodiment of the invention.

Referring to FIG. 2B, a top view of the common electrode 220 of the 3D display device 100, the liquid crystal molecules (160, 160') are divided into a plurality of domains (280, 280') (multi-domain) surrounding the one protrusion 210 in the right eye pixel R and the left eye pixel L which is adjacent to the right eye pixel R. Specifically, the number of the domains 280 in the right eye pixel R is equal to the number of the domains 280' in the left eye pixel L which is adjacent to the right eye pixel R. Additionally, the domain 280 in the right eye pixel R is a mirror image of the domain 280' in the left eye pixel L which is adjacent to the right eye pixel R.

Still referring to FIG. 2A, specifically, all of the light 300 through the right eye pixel R is approximately perpendicular to the long axis 200 of the liquid crystal molecules 160 which is received by right eye 250 of the observer after passing through the aperture 230 of the barrier 205. Similarly, all of the light 300' through the left eye pixel L is approximately perpendicular to the long axis 200 of the liquid crystal molecules 160' which is received by left eye 270 of the observer after passing through the aperture 230 of the barrier 205. Compared to the conventional vertical alignment (VA) mode in which the protrusion is disposed within the right eye pixel or the left eye pixel such that the liquid crystal molecules are inclined along at least two directions (forming at least one domain boundary) in the right eye pixel or the left eye pixel causing merely a part of the light to travel through the right eye pixel or the left eye pixel approximately perpendicular to the long axis of the liquid crystal molecules to be received by right eye or left eye of an observer (see average brightness), the invention in which the protrusion is disposed at the boundary between the right eye pixel and the left eye pixel such that the liquid crystal molecules are inclined along only one direction (no domain boundary) in the right eye pixel or the left eye pixel causing all of the light to travel through the right eye pixel or the left eye pixel approximately perpendicular to the long axis of the liquid crystal molecules to be received by right eye or left eye of an observer (see peak brightness) after passing through the light transparent element, significantly improves brightness.

Figure 3A:
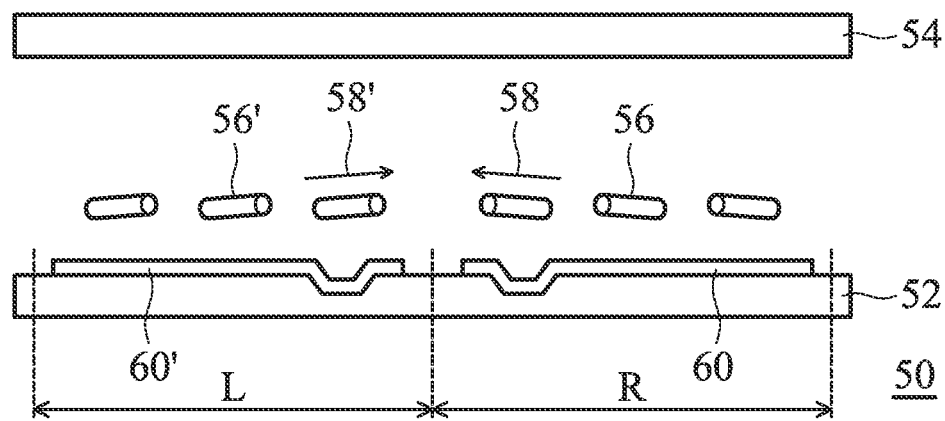
FIG. 3A shows a cross-section view of a 3D display device according to an embodiment of the invention.

According to one embodiment of the invention, referring to FIG. 3A, a 3D display device is provided. A 3D display device 50 comprises a first substrate 52 comprising a plurality of right eye pixels R and left eye pixels L in an alternate arrangement, a second substrate 54 opposite to the first substrate 52, a first optical modulating unit 56 with a first inclined direction 58 located in the right eye pixels R between the first substrate 52 and the second substrate 54, a second optical modulating unit 56' with a second inclined direction 58' located in the left eye pixels L between the first substrate 52 and the second substrate 54, and a light transparent element (not shown) disposed between the second substrate 54 and an observer. The first inclined direction 58 is distinct from the second inclined direction 58'.

The first substrate 52 may be a thin film transistor (TFT) array substrate. The second substrate 54 may be a color filter (CF) array substrate. In this embodiment, the light transparent element (not shown) is a fixed type barrier, for example a barrier with a plurality of apertures. In other embodiment, switchable barrier cells that can be turned ON/OFF by a voltage apply for LC cells are still available. In other embodiment, for example, a fixed type lenticular lens or switchable lens cells that can be turned ON/OFF by a voltage apply for LC cells are still available.

Figure 3B:
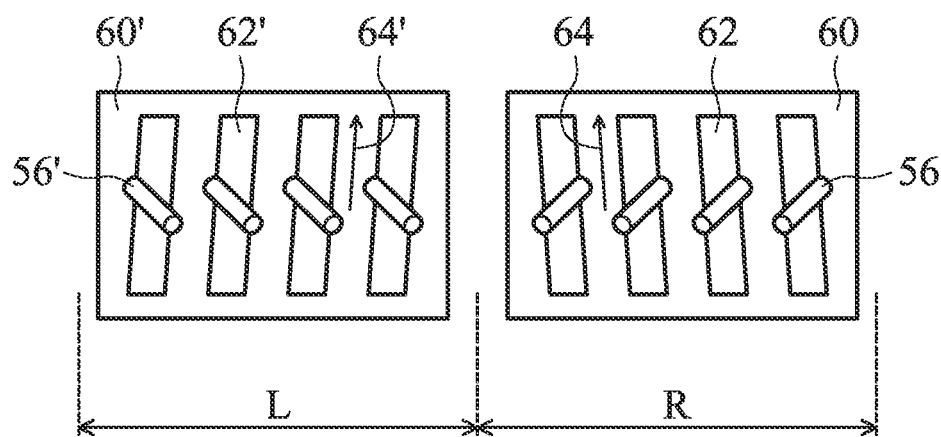
FIG. 3B shows a top view of a pixel electrode of a 3D display device according to an embodiment of the invention.

In this embodiment, the first optical modulating unit 56 and the second optical modulating unit 56' are liquid crystal molecules (56, 56'). In an in-plane switching (IPS) mode, simultaneously referring to FIGS. 3A and 3B, wherein FIG. 3B is a top view of pixel electrodes of the 3D display device 50, the 3D display device 50 further comprises a first pixel electrode 60 formed in the right eye pixel R of the first substrate 52. The first pixel electrode 60 comprises a plurality of first slits 62 with a first direction 64. Additionally, the 3D display device 50 further comprises a second pixel electrode 60' formed in the left eye pixel L of the first substrate 52. The second pixel electrode 60' comprises a plurality of second slits 62' with a second direction 64'. The first direction 64 is distinct from the second direction 64'.

In FIGS. 3A and 3B, the liquid crystal molecules 56 with the first inclined direction 58 switched by the first slits 62 with the first direction 64 located in the right eye pixels R and the liquid crystal molecules 56' with the second inclined direction 58' switched by the second slits 62' with the second direction 64' located in the left eye pixels L are collectively formed into a multi-domain structure.

In this embodiment, the structure of the IPS mode is good for transmittance due to no domain boundary in one pixel. The IPS mode doesn't have advantage regarding light direction control like the VA mode.

Figure 4:
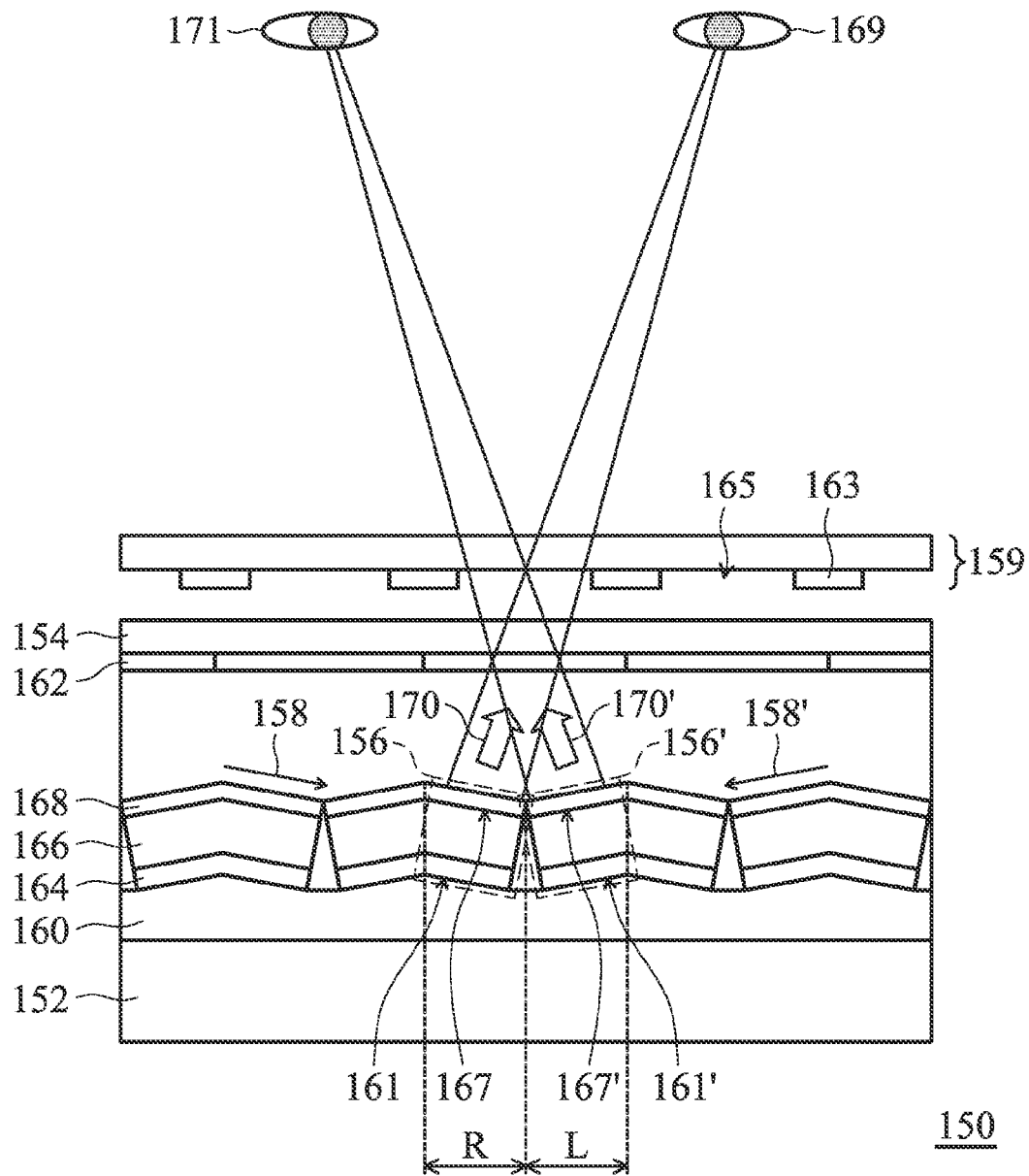
FIG. 4 shows a cross-section view of a 3D display device according to an embodiment of the invention.

According to one embodiment of the invention, referring to FIG. 4, a 3D display device is provided. A 3D display device 150 comprises a first substrate 152 comprising a plurality of right eye pixels R and left eye pixels L in an alternate arrangement, a second substrate 154 opposite to the first substrate 152, a first optical modulating unit 156 with a first inclined direction 158 located in the right eye pixels R between the first substrate 152 and the second substrate 154, a second optical modulating unit 156' with a second inclined direction 158' located in the left eye pixels L between the first substrate 152 and the second substrate 154, and a light transparent element 159 disposed between the second substrate 154 and an observer. The first inclined direction 158 is distinct from the second inclined direction 158'.

The first substrate 152 may be a thin film transistor (TFT) array substrate. In this embodiment, an organic film 160 having a first inclined surface 161 and a second inclined surface 161' is formed on the first substrate 152 such that the first optical modulating unit 156 and the second optical modulating unit 156' subsequently disposed on the organic film 160 are correspondingly inclined toward specific directions. A color filter 162 comprising, for example a red color filter, a green color filter and a blue color filter, is formed on the second substrate 154. In this embodiment, the light transparent element 159 is a fixed type barrier, for example a barrier 163 with a plurality of apertures 165. In other embodiment, switchable barrier cells that can be turned ON/OFF by a voltage apply for LC cells are still available. In other embodiment, for example, a fixed type lenticular lens or switchable lens cells that can be turned ON/OFF by a voltage apply for LC cells are still available.

In this embodiment, the first optical modulating unit 156 and the second optical modulating unit 156' are organic light emitting diodes (OLEDs) (156, 156') (e.g., OLED mode), for example top-emitting OLEDs. The OLED (156, 156') comprises a first electrode 164, a light emitting layer 166 having a surface (167, 167') formed on the first electrode 164 and a second electrode 168 formed on the light emitting layer 166. In accordance with various product requirements, the OLED (156, 156') emits light with various colors. In this embodiment, the OLED (156, 156') emits white light. Specifically, light 170 perpendicular to the surface 167 of the light emitting layer 166 of the OLED 156 emitted from the right eye pixel R is received by right eye 169 of an observer after passing through the aperture 165 of the barrier 163. Similarly, light 170' perpendicular to the surface 167' of the light emitting layer 166 of the OLED 156' emitted from the left eye pixel L is received by left eye 171 of an observer after passing through the aperture 165 of the barrier 163. Compared to the conventional planar OLEDs, the invention in which the inclined OLEDs are respectively disposed in the right eye pixel and the left eye pixel such that the light perpendicular to the surface of the light emitting layer of the OLEDs (e.g., the brightest light) emitted from the right eye pixel and the left eye pixel is respectively received by right eye and left eye of an observer (see peak brightness) after passing through the light transparent element, significantly improves brightness.

Figure 5:
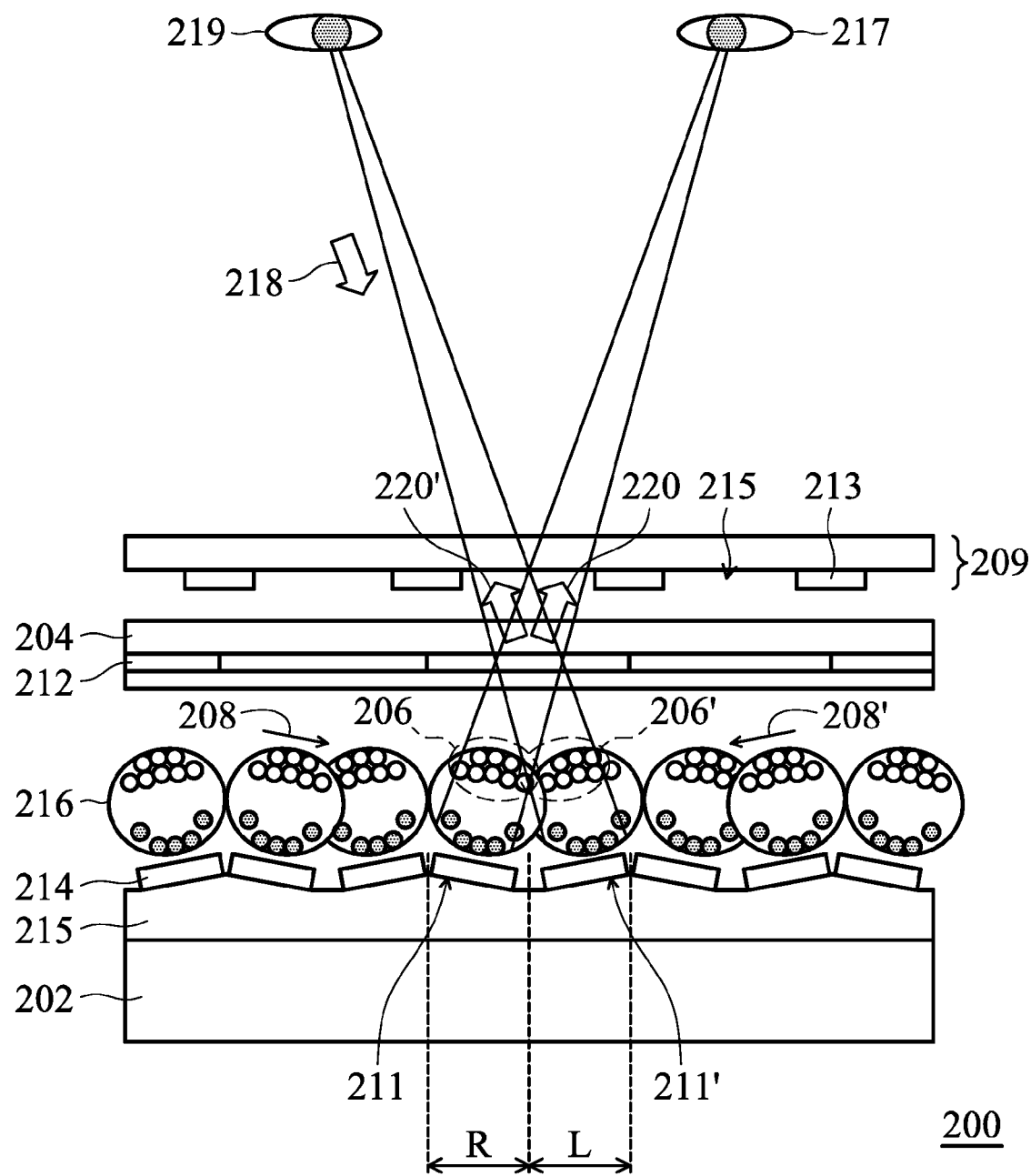
FIG. 5 shows a cross-section view of a 3D display device according to an embodiment of the invention.

According to one embodiment of the invention, referring to FIG. 5, a 3D display device is provided. A 3D display device 200 comprises a first substrate 202 comprising a plurality of right eye pixels R and left eye pixels L in an alternate arrangement, a second substrate 204 opposite to the first substrate 202, a first optical modulating unit 206 with a first inclined direction 208 located in the right eye pixels R between the first substrate 202 and the second substrate 204, a second optical modulating unit 206' with a second inclined direction 208' located in the left eye pixels L between the first substrate 202 and the second substrate 204, and a light transparent element 209 disposed between the second substrate 204 and an observer. The first inclined direction 208 is distinct from the second inclined direction 208'.

The first substrate 202 may be a thin film transistor (TFT) array substrate. In this embodiment, an organic film 215 having a first inclined surface 211 and a second inclined surface 211' is formed on the first substrate 202 such that reflective electrodes 214 subsequently disposed on the organic film 215 are correspondingly inclined toward specific directions. A color filter 212 comprising, for example a red color filter, a green color filter and a blue color filter, is formed on the second substrate 204. In this embodiment, the light transparent element 209 is a fixed type barrier, for example a barrier 213 with a plurality of apertures 215. In other embodiment, switchable barrier cells that can be turned ON/OFF by a voltage apply for LC cells are still available. In other embodiment, for example, a fixed type lenticular lens or switchable lens cells that can be turned ON/OFF by a voltage apply for LC cells are still available.

In this embodiment, the first optical modulating unit 206 and the second optical modulating unit 206' are reflective particles (206, 206') encapsulated by microcapsules 216 (e.g., e-paper mode). The reflective particles (206, 206') reflect outside light 218 to form a reflected light (220, 220'). The location of the reflective particles (206, 206') is controlled by the underneath reflective electrodes 214 so that the reflective particles (206, 206') are inclined toward specific directions due to the inclined reflective electrodes 214. Specifically, the reflected light 220 reflected by the reflective particles 206 emitted from the right eye pixel R is received by right eye 217 of the observer after passing through the aperture 215 of the barrier 213. Similarly, the reflected light 220' reflected by the reflective particles 206' emitted from the right eye pixel L is received by right eye 219 of the observer after passing through the aperture 215 of the barrier 213. Compared to the conventional planar reflective electrodes, the invention in which the inclined reflective electrodes are respectively disposed in the right eye pixel and the left eye pixel such that the above reflective particles are led toward specific directions in the right eye pixel and the left eye pixel causing the reflected light reflected by the reflective particles (e.g., the brightest light) emitted from the right eye pixel and the left eye pixel respectively to be received by right eye and left eye of an observer (see peak brightness) after passing through the light transparent element, significantly improves brightness.

The comparison of the ability of light direction control and the design of no-domain boundary between the various modes, for example VA, IPS, OLED and e-paper modes, of the optical modulating units of the invention is shown in Table 1.

TABLE 1

| Mode | Light direction control | No-domain boundary |
| --- | --- | --- |
| VA | Good | Yes |
| IPS | No | Yes |
| OLED | Good | No |
| e-paper | Good | No |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A 3D display device, comprising:
   a first substrate comprising a plurality of right eye pixels and a plurality of left eye pixels in an alternate arrangement;
   a second substrate;
   a first optical modulating unit with a first inclined direction located in the right eye pixels between the first substrate and the second substrate;
   a second optical modulating unit with a second inclined direction located in the left eye pixels between the first substrate and the second substrate, wherein the first inclined direction is distinct from the second inclined direction; and
   a light transparent element including a plurality of barriers and a plurality of apertures in an alternate arrangement,
   wherein at least one of the plurality of apertures overlaps with a border between one of the plurality of right eye pixels and adjacent one of the plurality of left eye pixels.

2. The 3D display device as claimed in claim 1, wherein the first optical modulating unit and the second optical modulating unit are liquid crystal molecules having a long axis.

3. The 3D display device as claimed in claim 2, further comprising a first pixel electrode formed in the right eye pixel of the first substrate, wherein the first pixel electrode comprises a plurality of first slits with a first direction.

4. The 3D display device as claimed in claim 3, further comprising a second pixel electrode formed in the left eye pixel of the first substrate, wherein the second pixel electrode comprises a plurality of second slits with a second direction, and the first direction is distinct from the second direction.

5. The 3D display device as claimed in claim 1, wherein the light transparent element comprises a lens or a barrier.

6. A display device, comprising:
a first substrate comprising a plurality of right eye pixels and a plurality of left eye pixels in an alternate arrangement;
a second substrate;
a first optical modulating unit with a first inclined direction between the first substrate and the second substrate;
a second optical modulating unit with a second inclined direction between the first substrate and the second substrate, wherein the first inclined direction is distinct from the second inclined direction; and
a light transparent element including a plurality of barriers and a plurality of apertures in an alternate arrangement,
wherein at least one of the plurality of apertures overlaps with a border between one of the plurality of right eye pixels and adjacent one of the plurality of left eye pixels.

* * * * *